United States Patent [19]

Spector et al.

[11] Patent Number: 4,677,294

[45] Date of Patent: Jun. 30, 1987

[54] SELF-CALIBRATING RADIATION SENSORS AND CONTROL FOR RADIATION SENSORS

[75] Inventors: Yechiel Spector, Tel Aviv; Amiram Peleg, Beer-Sheba; Ilan Cohen, Beer-Sheva, all of Israel

[73] Assignee: Spectronix Ltd., Tel Aviv, Israel

[21] Appl. No.: 166,779

[22] Filed: Sep. 4, 1980

[51] Int. Cl.[4] .......................... G01D 18/00; G01J 1/00

[52] U.S. Cl. ................................ 250/252.1; 250/342; 250/349

[58] Field of Search ..................... 250/252.1, 342, 349, 250/350

[56] References Cited

U.S. PATENT DOCUMENTS 3,296,438 1/1967 Main ................................ 250/252.1

3,902,067 8/1975 Anderson ............................ 250/342

4,048,500 9/1977 Moore ................................ 250/349

4,199,682 4/1980 Spector et al. ...................... 250/342

*Primary Examiner*—Janice A. Howell

*Attorney, Agent, or Firm*—Cushman, Darby & Cushman

[57] ABSTRACT

Self-calibrating radiation detection apparatus comprising a detector element and calibration apparatus for maintaining a generally constant response of the detector element to a predetermined radiation input notwithstanding changes in the level of background radiation sensed by the detector element. There is also provided control apparatus for operating a plurality of radiation detectors including apparatus for disabling the output of the detectors in response to a continuing radiation input of predetermined duration.

12 Claims, 8 Drawing Figures

SELF-CALIBRATING RADIATION SENSORS AND CONTROL FOR RADIATION SENSORS

The present invention relates to radiation sensors and to control circuitry for radiation sensors.

There is disclosed in applicants' earlier filed Israel Patent Applications Nos. 54137, 54138 and 54139, fire and explosion suppression apparatus employing the combined outputs of UV and IR detectors. It is known that IR detectors are usually calibrated to a predetermined and fixed threshold radiation level for response. This fixed calibration involves difficulties where the radiation background is changing, since the sensor response to a predetermined radiation signal changes as a function of background.

It is also appreciated by applicants that the presence of spurious background UV radiation can result in false alarms. It is therefore desirable to prevent such false alarms in the sensed continuous presence of UV radiation.

The present invention seeks to provide radiation sensing apparatus whose response to a given predetermined signal input is substantially constant in the presence of a changing background. The present invention also seeks to provide radiation sensing apparatus which does not produce a detection output in the presence of a continuous U.V. radiation input.

There is thus provided in accordance with an embodiment of the present invention self-calibrating radiation detection apparatus comprising a detector element; calibration apparatus for maintaining a generally constant response of the radiation detector element to a predetermined radiation input notwithstanding changes in the level of background radiation sensed by the detector element.

Further in accordance with an embodiment of the invention there is provided control apparatus for a radiation detection system comprising a UV detector and another radiation detector including apparatus for disabling the combined output of the system in the sensed continuous presence of UV radiation.

Additionally in accordance with an embodiment of the invention the self-calibrating radiation detection apparatus comprises a radiation detector and a calibrating filament disposed in predetermined radiation communicating relationship thereto. The detector and the filament may be fixedly mounted in a medium which permits optical communication therebetween.

The invention will be more fully understood and appreciated from the following detailed description taken in conjunction with the drawings in which.

DETAILED DESCRIPTION OF THE INVENTION

Figure 1A:
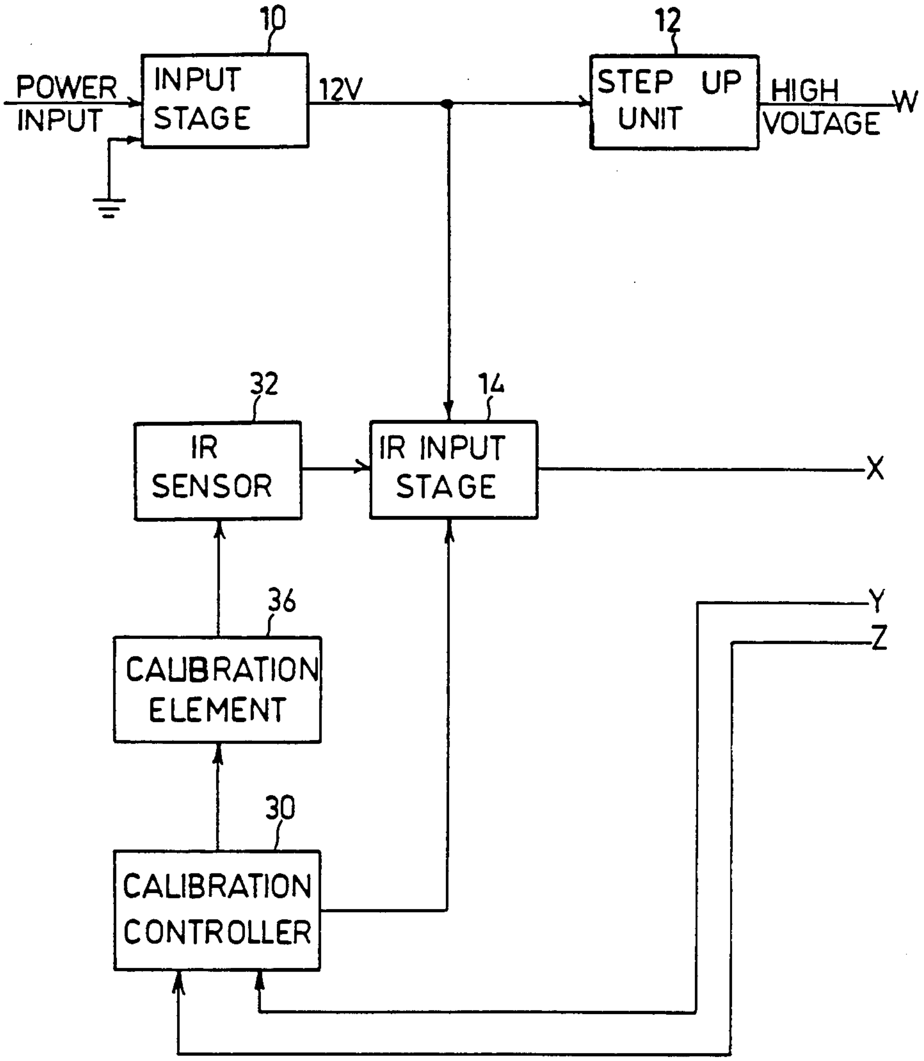
FIG. 1 is a block diagram of radiation detection apparatus constructed and operative in accordance with an embodiment of the invention.
Figure 1B:
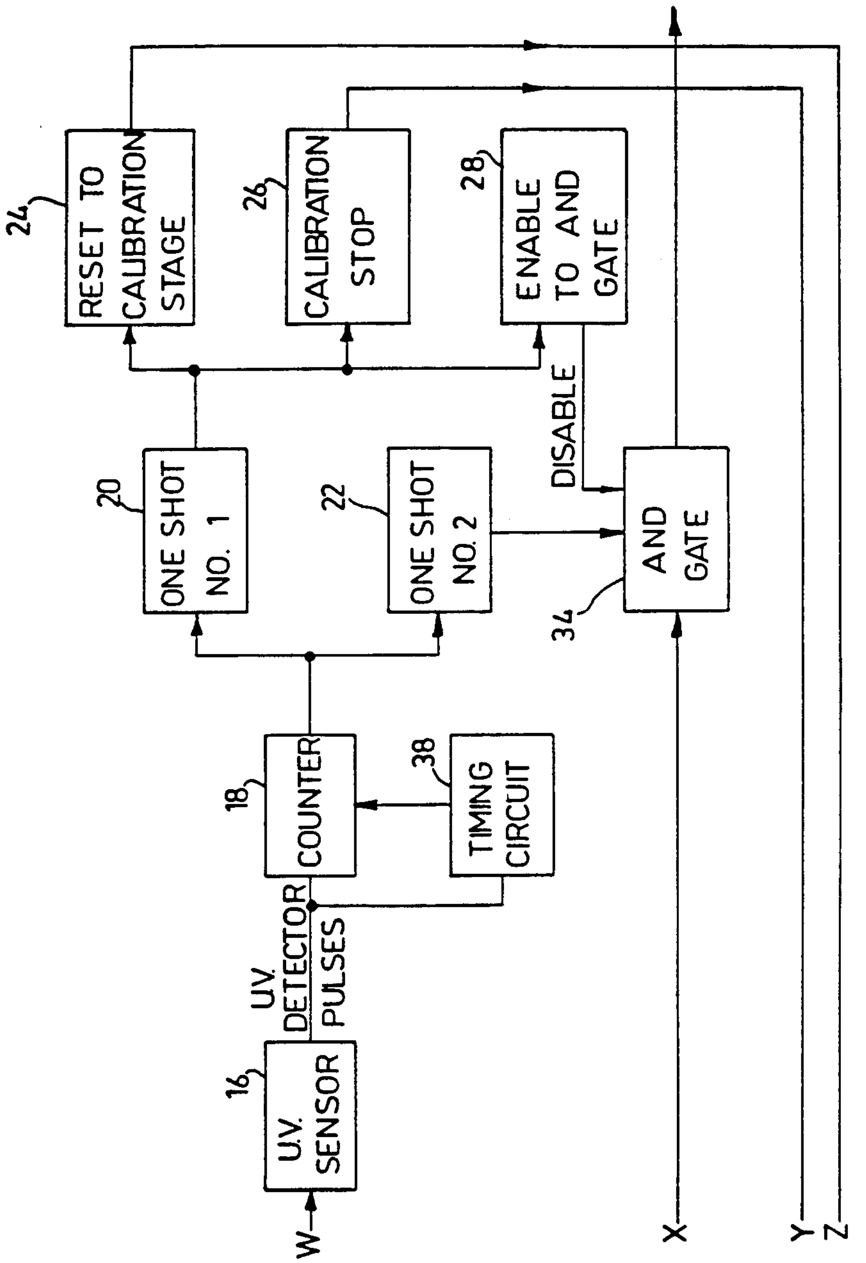
Figure 2A:
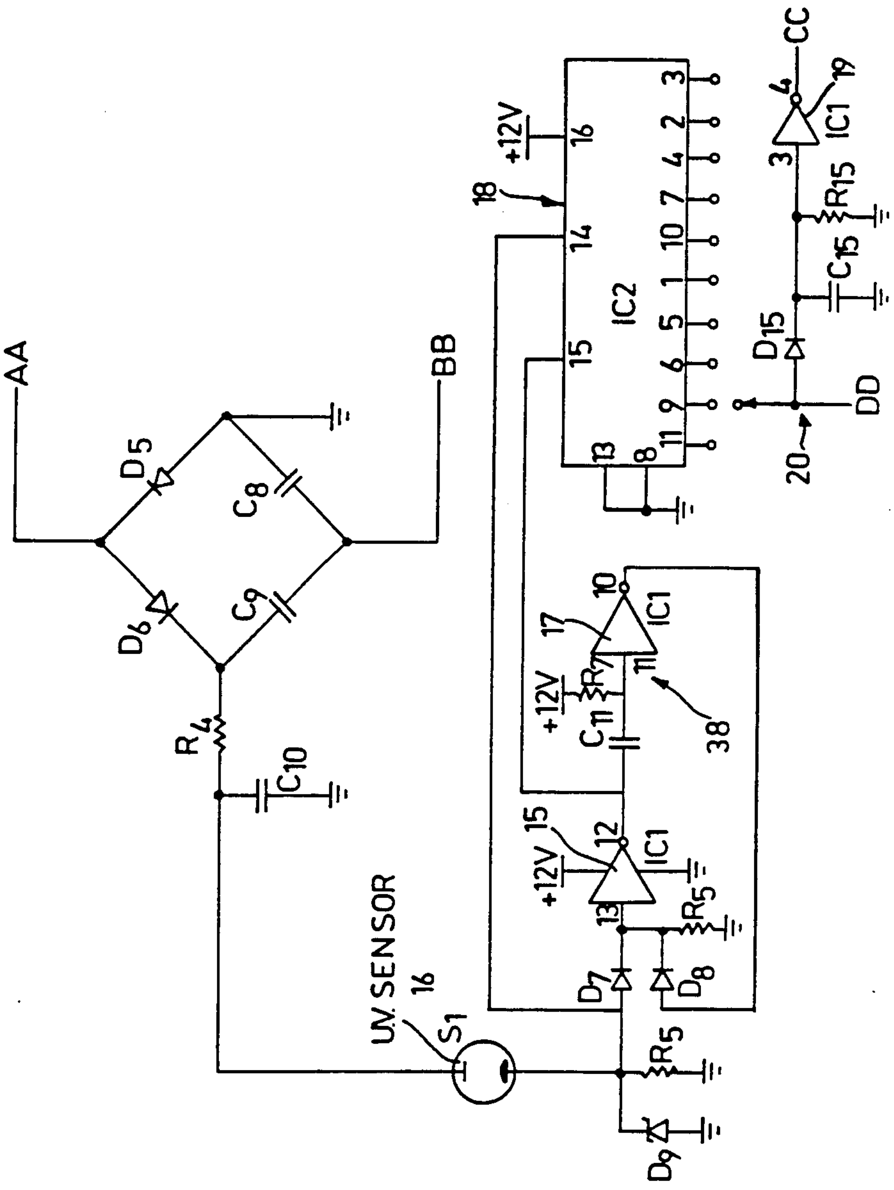
FIG. 2 is a detailed schematic illustration of the circuitry of FIG. 1.
Figure 2B:
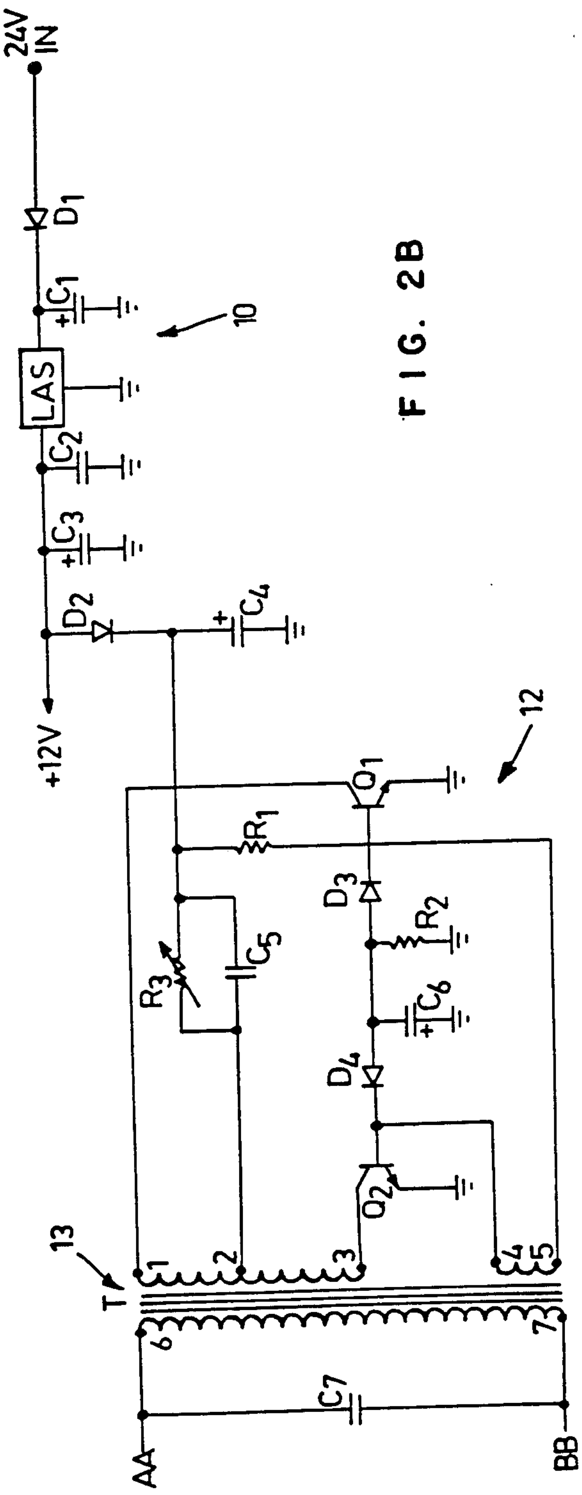
Figure 2C:
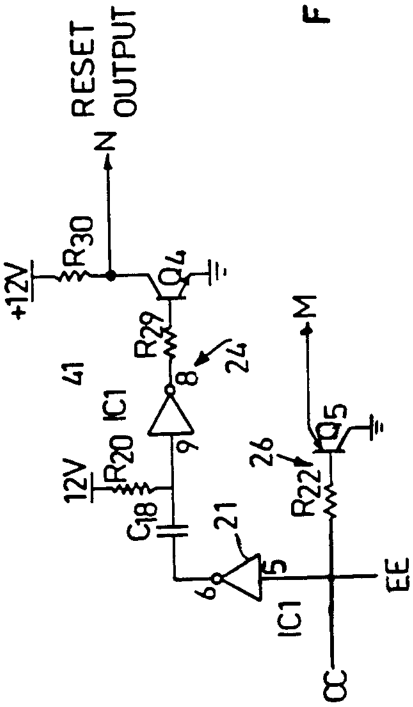
Figure 2D:
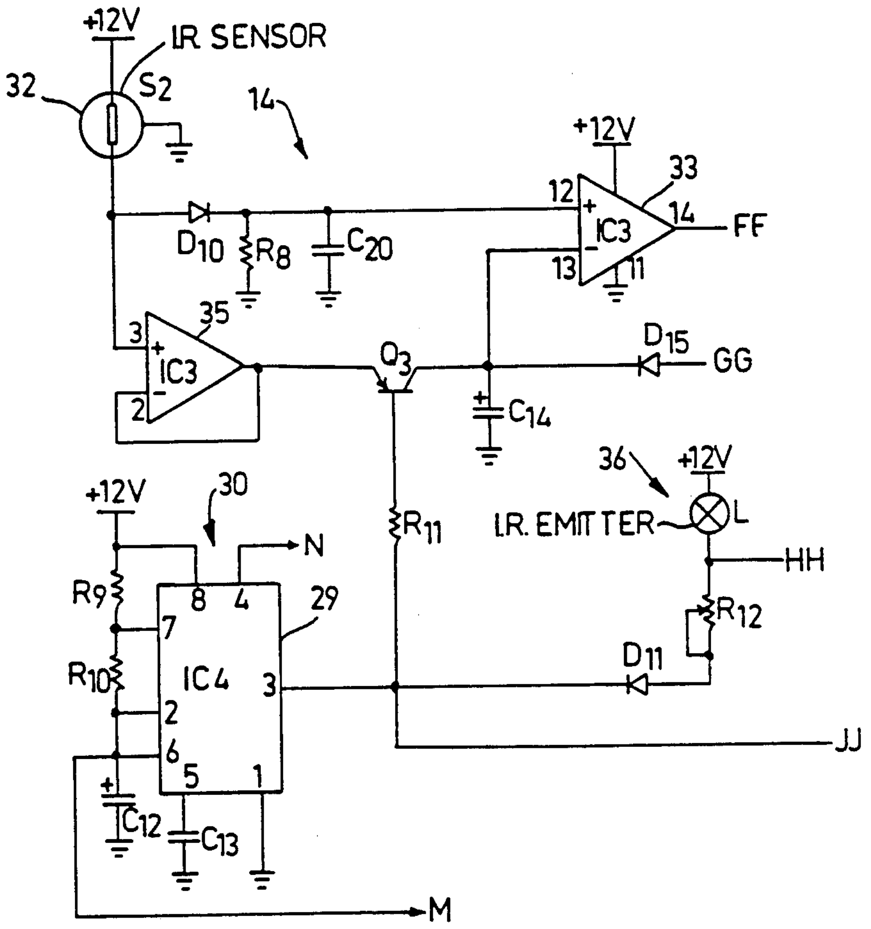
Figure 2E:
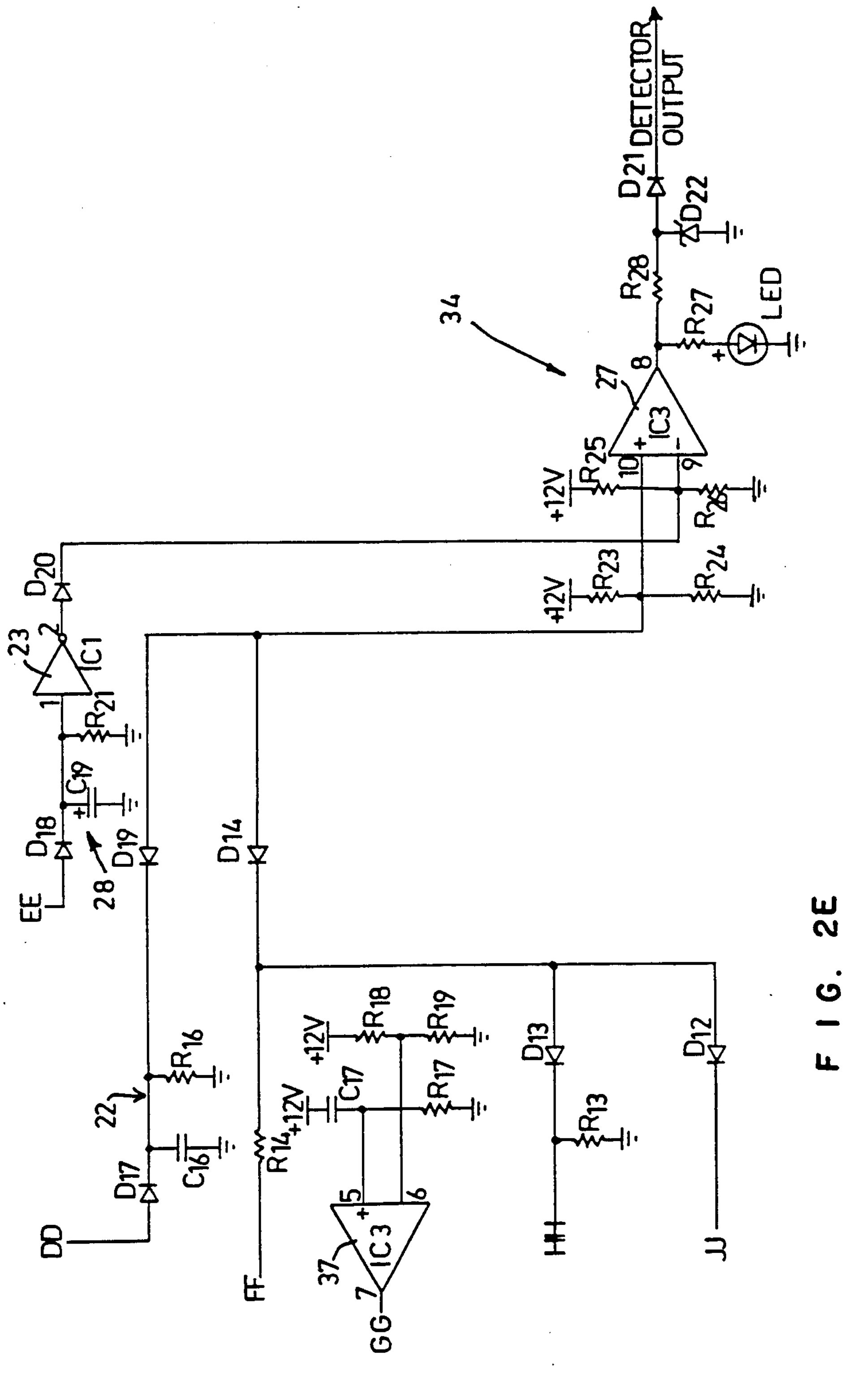

Reference is now made to FIG. 1 which is a block diagram of detection and control circuitry constructed and operative in accordance with an embodiment of the present invention. An input stage 10, typically a Lambda 1512 voltage regulator, receives a power input and provides a stabilized 12 Volt output to a step up unit

12, typically comprising a transformer and oscillator, and to an IR input stage 14.

A UV sensor 16, such as an Edison 630, receives a high voltage (500 VDC approx.) from the step up unit 12. Sensor 16 provides output pulses so long as UV radiation is present thereat. Counter 18, such as a 4017 receives the pulse output of sensor 16 and provides an output signal to first and second one-shot circuits 20 and 22 when it receives a predetermined number of output pulses from sensor 16 before counter reset by a timing circuit 38. This number corresponds to a predetermined threshold established for receipt of UV radiation.

One shot circuit 20 remains SET when the output of counter 18 is present thereat and for a time t1 thereafter. Time t1 may be, for example, 5 seconds. Thus if counter outputs appear with frequency of at least 1/t1, the one shot circuit 20 remains SET and indicates the continuous presence of UV radiation.

The output of one-shot circuitry 20 is supplied to reset to calibration stage circuitry 24, calibration stop circuitry 26 and to enable to AND gate circuitry 28. Circuitry 24 is operative in response to RESET of one shot circuitry 20 to provide an output signal to calibration control circuitry 30 for causing calibration of the IR sensor 32. This calibration thus occurs upon termination of receipt of UV radiation.

Circuitry 26 is operative to provide a signal to calibration control circuitry 30 for terminating calibration of the IR sensor immediately upon return of one shot circuitry 20 to a SET state. Circuitry 28 is operative to disable the output of an AND gate 34 beginning a predetermined time t3, typically 60 seconds, following SET of one shot circuitry 20.

The output of one shot circuit 22 is a pulse 22 typically of duration 100 msec. which is supplied to AND gate 34.

IR sensor 32 is fixedly associated with a calibration element 36 such as a filament representing a standard flame and may be enclosed together therewith in an epoxy enclosure which permits radiation communication therebetween. This combination enables the IR sensor to be calibrated to the standard flame under every operating condition and background so as to provide uniformly accurate results. Operation of the calibration element is controlled by calibration control circuitry 30 which also provides an output to the IR input stage 14. The output of the IR sensor, which may be a P398 R of Hamamatsu, is supplied via the IR input stage 14 to AND gate 34. Calibration controller 30 prevents the output of the IR sensor 32 from reaching AND gate 34 during calibration.

AND gate 34 is operative for providing a detection output to utilization circuitry (not shown) during simultaneous appearance of outputs from input stage 14 and from one shot circuitry 22 indicating simultaneous detection of UV and IR radiation other than in the continuous presence of UV radiation and when not disabled by circuitry 28 which indicates continuous presence of UV from a spurious source.

Reference is now made to FIG. 2 which is a schematic illustration of the circuitry illustrated in block diagram form in FIG. 1. Where appropriate the same reference numerals will be used as in FIG. 1.

Voltage input stage 10 comprises a pair of diodes D1 and D2 and capacitors C1, C2, C3 and C4 interconnected with a Lambda 1512 chip as shown. Step up unit 12 comprises a pair of transistors Q1 and Q2 whose bases are interconnected by diodes D3 and D4; capacitors C5 and C6 and resistors R1 and R2 connected as shown at the input of a transformer 13, across whose output is coupled a capacitor C7 and a rectifier comprising diodes D5 and D6 and capacitors C8 and C9 connected as shown via a resistor R4 and a grounded capacitor C10 to the UV sensor 16.

The output of the UV sensor is supplied to counter 18 and associated circuitry comprising diodes D7, D8 and D9, resistors R5, R6 and R7, capacitor C11 and a pair of inverters 15 and 17.

The output of counter 18 is supplied to one shot circuit 20 comprising a diode D16, a capacitor C15, a resistor R15 and an inverter 19 whose output is supplied to circuits 24, 26 and 28. Circuit 24 comprises a capacitor C18, a resistor R20 a pair of inverters 21 and 41, a resistor R29, a resistor R30 and a transistor Q4 connected as shown. Circuit 26 comprises a resistor R22 and a transistor Q5 and circuit 28 comprises a diode D18, a capacitor C19, a resistor R21, an inverter 23 and a diode D20.

A one shot circuit 22 also receives the output of counter 18 and comprises a diode D17, a capacitor C16, a diode D19 and a resistor R16 and provides an output to AND gate circuitry 34. AND gate circuitry 34 comprises a diode D21, a Zener D22 and an LED D23 as well as resistor pairs R23–R24 and R25–R26, each defining a voltage divider for respective positive and negative inputs of an operational amplifier 27 at whose output the aforesaid diodes D21–D23 are connected.

Calibration control circuitry 30 comprises a timer 29 which receives inputs from circuits 24 and 26 and which provides an output via a diode D11 and a variable resistor R12 to an IR emitter element 36 serving as an IR calibration element which, as mentioned above, is disposed in fixed propinquity and predetermined radiation communication relationship with the IR sensor 32.

Resistors R9 and R10 and capacitors C12 and C13 are associated with timer 29 as shown in FIG. 2. IR emitter 36 is connected via a grounded resistor R13 and diode D13 to the junction of resistor R14 and diode D14. This junction is also connected via a diode D12 and a resistor R11 to the base of transistor Q3.

The output of IR sensor 32 is supplied to IR input stage 14 including a diode D10 a resistor R8 and a capacitor C20 coupled between ground and the positive input of an operational amplifier 33. The output of the operational amplifier 33 is supplied via a resistor R14 and a diode D14 to the IR input of AND gate circuitry 34 at the positive input of operational amplifier 27.

The negative input to operational amplifier 33 is connected to a capacitor C14 which is charged by the follower 35 and Q3 to a reference voltage. The control of transistor Q3 is provided by calibration control circuitry 30. An operational amplifier 37 also charges capacitor C14 but only when the detector is energized, providing a high reference voltage, in order to prevent a false indication of detection of IR radiation until the voltage is stabilized. Resistors R17, R18 and R19 and capacitor C17 are associated with amplifier 37 as illustrated.

Figure 3A:
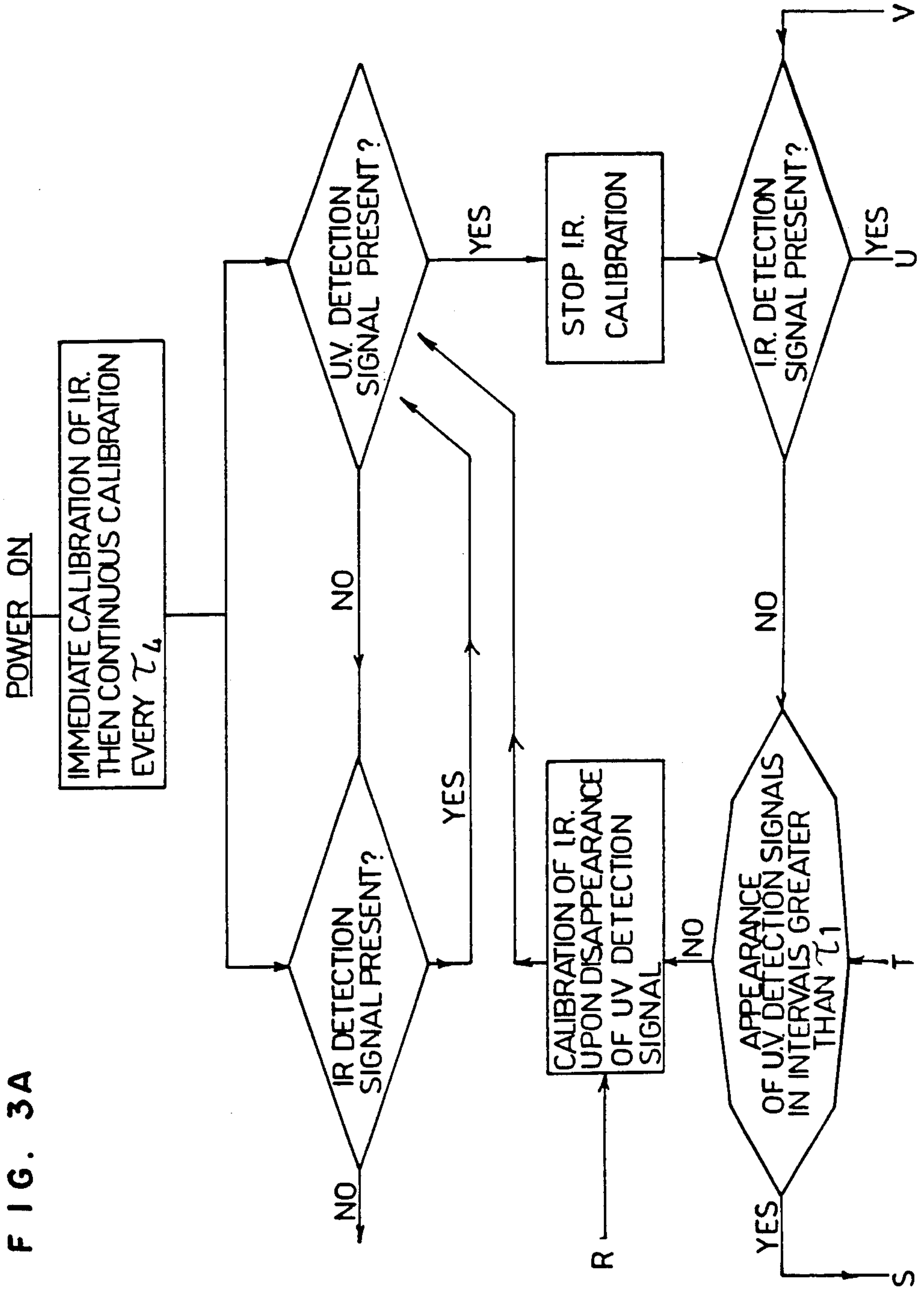
FIG. 3 is a flow chart illustrating the operation of the circuitry of FIGS. 1 and 2.
Figure 3B:
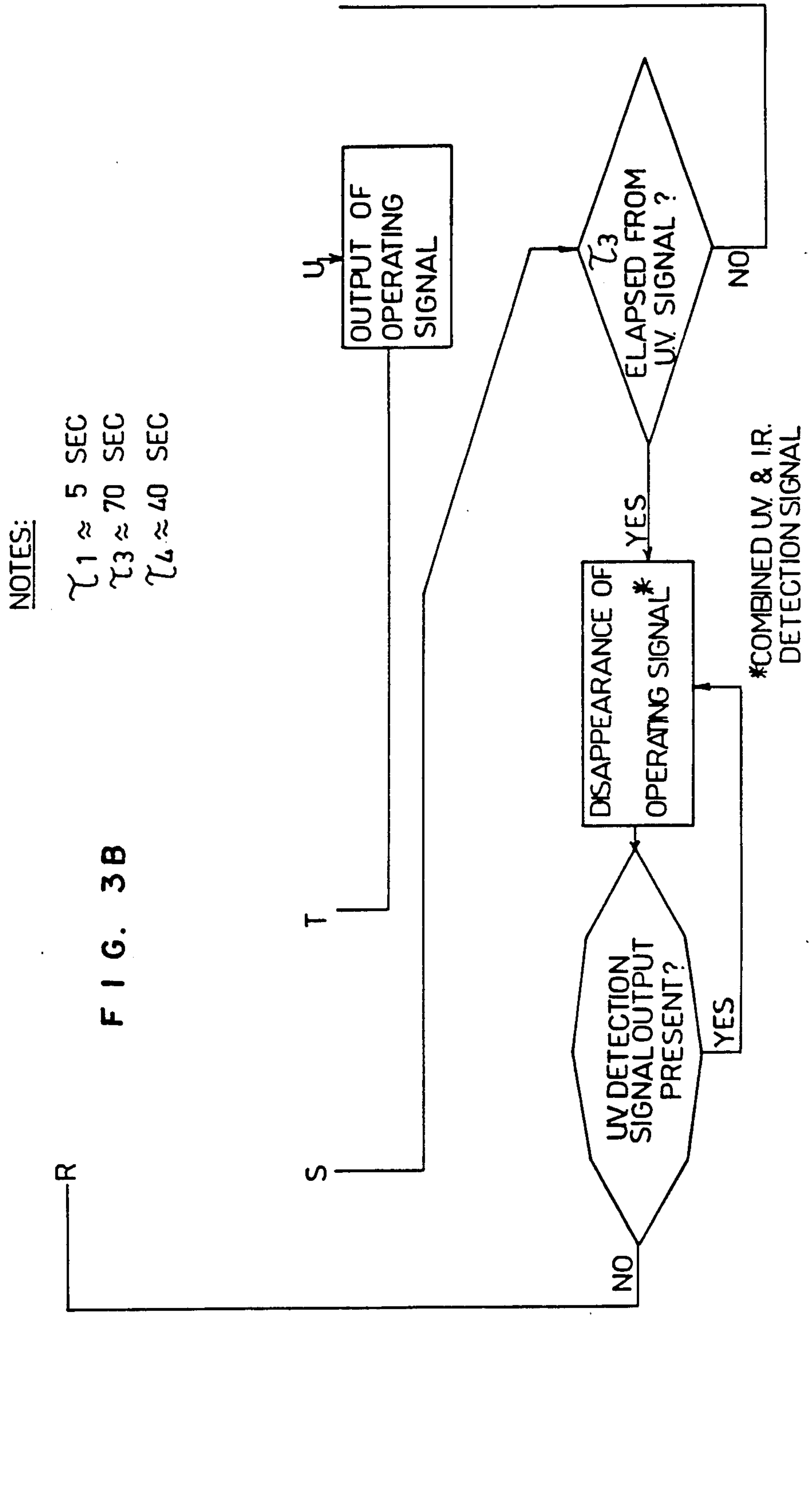

Reference is now made to FIG. 3 which is a flow chart diagrammatically illustrating the operation of the circuitry of FIGS. 1 and 2. Upon energization of the circuitry, the IR sensor is automatically and immediately calibrated. The calibration is repeated each t4 (typically 30 seconds). If there is detection by the UV detector, calibration of the IR sensor is terminated. If the IR sensor then detects the presence of IR radiation, a UV and IR detection signal is provided to the AND gate, providing an operating signal.

Whether or not the IR sensor detects, the circuitry inquires whether the UV detection has been continuous over at least 5 seconds. If not, the IR sensor is calibrated once the UV detection terminates. If the UV signal has been continuous over at least five seconds (t3), the circuitry inquires whether t3 (60 seconds) have passed since the appearance of the UV detection output. If so, the operation of the detector combination through the AND gate is disabled and remains so until the UV detection signal terminates, whereupon IR calibration takes place once again. If the UV detection signal has not been present for 60 seconds, the detector is not disabled and the detection signal indicating combined UV and IR detection can pass through the AND gate to the utilization circuitry.

It will be appreciated by persons skilled in the art that the invention is not limited to what has been particularly shown and described herein. Rather the scope of the invention is defined only by the claims which follow.

We claim:

1. For use in fire and explosion suppression apparatus, a self calibrating radiation detection apparatus comprising:

(a) a combination of detector elements comprising:
 a first detector element for detection of radiation within a first range of wave-lengths;
 a second detector element for detection of radiation within a second range of wave-lengths different from said first range; and
 means for combining the outputs of said first and second detector elements; and (b) calibration apparatus for maintaining a generally constant response of said first detector element to a predetermined radiation input notwithstanding changes in the level of background radiation sensed by said first detector element and comprising:
 a calibrator for said first detector element comprising a timer which provides an output for a calibrating filament disposed in rigid spaced relationship with said first detector element, the timer receiving an input which is effective to terminate calibration upon detection of radiation by said second detector element and which is effective also to initiate calibration upon termination of receipt of radiation by said second detector element.

2. Apparatus according to claim 1 and wherein said calibrating filament when energized represents a predetermined standard fire.

3. Apparatus according to claim 1 and wherein said detection apparatus is incorporated into fire and explosion detection apparatus.

4. Apparatus according to claim 1 and wherein said first detector element comprises an IR detector.

5. Apparatus according to claim 1 and wherein said second detector element comprises a UV detector.

6. Apparatus according to claim 4 and wherein said second detector element comprises a UV detector.

7. Apparatus according to claim 1 and wherein said rigid spaced relationship of said first detector element and said calibrating filament is achieved by disposing them in a rigid medium which permits radiation communication therebetween.

8. Apparatus according to claim 7 and wherein said medium is an epoxy resin.

9. Control apparatus for operating a plurality of detector elements which comprise:

a first detector element for detection of radiation within a first range of wave-lengths;

a second detector element for detection of radiation within a second range of wave-lengths different from said first range; and means for producing a combined output of said first and second detector elements; and said control apparatus comprising:

means for periodically calibrating one of said first and second detector elements; and means for disabling said combined output in response to a continuing radiation input of predetermined duration at the other of said first and second detector elements.

10. Apparatus according to claim 9 and wherein said first detector element is an IR detector which is periodically calibrated, said second detector element is a UV detector and said means for disabling is responsive to a UV radiation input at said UV detector of predetermined duration.

11. For use in fire and explosion suppression apparatus, a self calibrating radiation detection apparatus comprising:

(a) a combination of detector elements comprising:

an infrared detector element;

an ultraviolet detector element; and means for combining the outputs of said infrared detector element and said ultraviolet detector element; and (b) calibration apparatus for maintaining a generally constant response of said infrared detector element to a predetermined radiation input notwithstanding changes in the level of background radiation sensed by said infrared detector element and comprising:

a calibrator for said infrared detector element comprising a timer which provides an output for an infrared emitter element disposed in rigid spaced relationship with said infrared detector element, the timer receiving an input which is effective to terminate calibration upon detection of radiation by said ultraviolet detector element and which is effective also to initiate calibration upon termination of receipt of radiation by said ultraviolet detector element.

12. Apparatus according to claim 11 and wherein said detection apparatus is incorporated into fire and explosion detection apparatus.

* * * * *